United States Patent [19]

Sakai et al.

[11] Patent Number: 4,644,403
[45] Date of Patent: Feb. 17, 1987

[54] IMAGE PICKUP APPARATUS

[76] Inventors: Shinji Sakai; Seiji Hashimoto, both c/o Canon Kabushiki Kaisha: (Tamagawa-Jigyosho) 770, Shimonoge, Takatsu-Ku, Kawasaki-shi, Kanagawa-ken, Japan

[21] Appl. No.: 861,715

[22] Filed: May 12, 1986

Related U.S. Application Data

[63] Continuation of Ser. No. 602,731, Apr. 23, 1984, abandoned.

[30] Foreign Application Priority Data

Apr. 28, 1983 [JP] Japan ................... 58-75838

[51] Int. Cl.$^4$ ............................................. H04N 3/14
[52] U.S. Cl .................................. 358/213; 357/24
[58] Field of Search ............... 358/213, 172, 167, 221, 358/176–178; 357/24 LR

[56] References Cited

U.S. PATENT DOCUMENTS

| | | | |
|---|---|---|---|
| 4,038,690 | 6/1977 | Hoagland | 358/213 |
| 4,245,164 | 1/1981 | Funahashi | 357/24 LR |
| 4,455,574 | 6/1984 | Hashimoto et al. | 358/213 |
| 4,498,105 | 2/1985 | Crawshaw | 358/213 |

Primary Examiner—Thomas W. Brown
Assistant Examiner—Stephen Brinich

[57] ABSTRACT

An image pickup apparatus comprising: a photosensing part for converting an object to be photographed into electrical information and storing; storage control means for outputting a signal to control the storage state in the photosensing part; clamping means for clamping a part of electrical information read out from the photosensing part; and inhibiting means for inhibiting a change in output signal of the control means at least during the clamping operation by the clamping means.

48 Claims, 16 Drawing Figures

IMAGE PICKUP APPARATUS

This is a continuation of application Ser. No. 602,731, filed Apr. 23, 1984 now abandoned.

BACKGROUND OF THE INVENTION

1. Field of the Invention

The present invention relates to an image pickup apparatus which can obtain an accurate clamping operation.

2. Description of the Prior Art

Generally, to prevent blooming in solid state image sensors such as a CCDs and the like, there have been considered a method whereby an overflow drain is provided in a photosensing surface and a method whereby the overflow carrier is extinguished using surface recombination, thereby controlling the storage state in the photosensing surface.

The latter method, in particular, since an aperture efficiency in the photosensing surface is not sacrificed, has advantages that sensitivity is high and the degree of integration can be improved, thereby enabling the horizontal resolution power to be increased, and the like.

FIGS. 1 to 3 show diagrams to describe a principle of such a blooming preventing method by way of the surface recombination, in which FIG. 1 shows a front view of a typical frame transfer type CCD.

In the diagram, a reference numeral 1 denotes a photosensing part consisting of a plurality of vertical transfer registers having photosensitivity.

Also, a reference numeral 2 indicates a storage part consisting of a plurality of light shielded vertical transfer registers.

A numeral 3 is a horizontal transfer register and it is possible to fetch the information in each vertical transfer register of the storage part 2 into this horizontal transfer register by simultaneously shifting such information by one bit, and then by allowing the register 3 to perform the horizontal transfer operation, a video signal can be derived from an output amplifier 4. OB represents a vertical transfer register part which is light shielded in the vertical direction.

Generally, the information formed in each vertical transfer register of the photosensing part 1 is vertically transferred into the storage part 2 during the vertical blanking interval in the standard television system and is sequentially read out line by line from the horizontal transfer register 3 during the next vertical scanning interval.

It is now assumed that the photosensing part 1, storage part 2 and horizontal transfer register 3 are respectively two-phase driven; that their respective transfer electrodes are $P_1$, $P_2$, $P_3$, $P_4$, $P_5$, and $P_6$; and that their transfer clocks are $\phi_{P1}$, $\phi_{P2}$, $\phi_{P3}$, $\phi_{P4}$, $\phi_{P5}$, and $\phi_{P6}$.

FIG. 2 is a diagram showing a potential profile under such transfer electrodes $P_1$ to $P_6$. For example, a low potential section and a high potential section are formed by way of ion implantation or the like under each electrode provided over a p-type silicon substrate 6 through an insulating layer 5. For instance, when a low level voltage $-V_1$ is applied to the electrodes $P_2$, $P_4$ and $P_6$ and a high level voltage $V_2$ is applied to the electrodes $P_1$, $P_3$ and $P_5$, a potential as indicated by the solid line in FIG. 2 is formed. On the other hand, when a low level voltage $-V_1$ is applied to the electrodes $P_1$, $P_3$ and $P_5$ and a high level voltage $V_2$ is applied to the electrodes $P_2$, $P_4$ and $P_6$, a potential as indicated by the broken line in the diagram is formed.

Therefore, by applying alternating voltages with mutually opposite phase to the electrodes $P_1$, $P_3$, $P_5$ and to the electrodes $P_2$, $P_4$, $P_6$, the carriers are sequentially transferred in the negative ($-$) direction (to the right in the diagram).

In addition, the alternate long and short dash line in the diagram indicates the potential in case of applying a large positive voltage $V_3$ to the electrodes. Since the well of this potential becomes the inversion state, the overflow carrier over a predetermined quantity will have been recombined with the majority carrier and will have disappeared.

FIG. 3 is a diagram showing the relation between such an electrode voltage and a shape of the internal potential in the direction of thickness of the semiconductor substrate 6. As can be seen from this graph, the potential well for the electrode voltage $V_3$ becomes shallow and becomes a second state in that the overflow carrier recombines with the majority carrier at the interface with the insulating layer.

On the other hand, the potential becomes an accumulation state as a first state at the electrode voltage $-V_1$. In this state, the majority carrier can be easily collected around the interface and this majority carrier is supplied from, for example, a channel stopper region (not shown).

Therefore, by alternately applying voltages $-V_1$ and $V_3$ to the electrode $P_1$ in the state in that a barrier is formed by applying, for example, the voltage $-V_1$ to the electrode $P_2$, the minority carrier to be accumulated under the electrode $P_1$ is limited to a quantity below a predetermined quantity.

However, on the contrary, to effectively extinguish the overflow carrier, the accumulation state and the inversion state have to be alternately formed at a high speed in the semiconductor substrate during the accumulating interval. Therefore, there is a problem that electric power consumption is large. There is also a problem that when such pulse control is performed at high speed, a noise to be caused due to this pulse is mixed into the signal.

FIGS. 4A and 4B are diagrams for describing such problems. In the diagrams, a reference numeral 100 denotes a part of a driver circuit which will be described later and it also serves to supply a driving pulse (hereinbelow, referred to as an AB pulse $\phi_{AB}$) at predetermined peak to peak levels $-V_1$ and $V_3$ in response to timing of a pulse $\phi_{ab}$ from a clock generator which will be described later.

Reference numerals 101 and 109 denote differentiating capacitors; 102 and 108 are biasing diodes; 104 and 107 are transistors; 103 and 106 are smoothing capacitors; and 105 is an interelectrode capacitance of the electrode $P_1$.

FIG. 4B is a diagram showing the waveforms at each part. The operation of the circuitry shown in FIG. 4A will now be described in conjunction with FIG. 4B.

As shown in FIG. 4B, when the pulse $\phi_{ab}$ is input, the transistor 107 is turned on in response to its leading edge, so that a current $i_{AB}$ flows from the capacitance 105 toward the power supply $-V_1$ and this power supply $-V_1$ is applied to the capacitance 105 and is charged therein.

In addition, the transistor 104 is turned on in response to the leading edge of the pulse $\phi_{ab}$, so that the power supply $+V_3$ is applied to the capacitance C and is charged at this voltage V₃. In this case, since the interelectrode capacitance 105 has equivalently an input capacitance of some 1000 pF, when the pulse at the voltages $-V_1$ and $V_3$ (hereinbelow, abbreviated as AB pulse $\phi_{AB}$) is applied, a differential current of a few A (amperes) will have flowed instantaneously. When this current flows through the silicon substrate of the image sensor, a noise of a few 10 mV (which is called an AB noise here) will have been eventually produced since a resistance of the silicon substrate has a value of a few 10 mΩ. To reduce this noise, methods can be considered whereby the resistance of the silicon substrate is decreased and whereby an absolute value of a differential current is diminished by making the leading and trailing characteristics of the AB pulse smooth; however, the AB noise of a few mV will have remained even by these methods.

On the other hand, a standard level of the signal to be output from the image sensor is ordinarily a few 100 mV and when the dynamic range at the image pickup time is set to be about four times the standard signal level, a general video signal level will be a value of the order of about a few 100 mV as well.

Therefore, in a general movie image pickup device, in the case where an object is particularly dark, the AB noise having a level of the order which cannot be ignored appears on a screen.

In addition, as for an output signal of the image sensor, the signal corresponding to the optically shielded section OB is generally clamped as a black reference signal by a DC reproducing circuit called a clamping circuit. When a pulse is supplied in the interval of this black reference signal, the AB noise will have been added to the black reference signal. Therefore, when this signal is clamped, a variation in clamping potential due to the AB noise is caused and this becomes a line-drawing like low frequency noise on display, causing a picture quality to remarkably deteriorate.

Although a variation rate of this clamping potential is not determined by only a ratio between the foregoing standard signal level (100 mV) and the level (a few mV) of the AB noise, it has been confirmed that the noise of a few 10 mV remains with regard to the NTSC signal level even when the clamping effect, gamma characteristics, and the like are considered. In addition, such a phenomenon is remarkable particularly in the case where the AB pulse $\phi_{AB}$ is asynchronous with the TV synchronization (for example, horizontal synchronization), where the repetitive period of the AB pulse is changed in accordance with the luminous level or the like of the object, where the phases of the clamp pulse and AB noise were changed, or the like.

Furthermore, as another method to control the storage state at the photosensing surface of the image pickup device, a method is considered whereby the accumulated charges are once cleared in one field to control the substantial storage time while performing the accumulation in the photosensing surface at the field period of the standard television system.

A problem in such a method for controlling the storage state will be described hereinbelow.

As for an ordinary video camera, in case of performing the image pickup synchronously with the vertical sync signal, an exposure time, i.e., a shutter speed is fixed at 1/60 second since the repetitive frequency of the vertical sync signal is 60 Hz. However, in case of photographing an object which is moving at a high speed, to obtain a sharp picture image without blur, it is necessary to make the shutter speed variable, in particular, to make it variable in order to have high speed. Particularly, this is important in a still video system which performs one shot photography.

In case of obtaining a shutter speed shorter than 1/60 second, there is a method whereby, for instance, a rotary shutter or the like is used synchronously with the vertical sync signal, or the like; However, this method has a drawback such that when the exposure time becomes short, it is difficult to follow mechanically or its mechanism becomes complicated, and the like. On the other hand, there is a method as shown in FIG. 5 for performing the signal processing. That is, for the ordinary driving period of accumulation and transfer, this method is performed in the manner such that by supplying a vertical transfer clock as indicated by b in FIG. 5 to the transfer electrode of the photosensing part at appropriate timing, the charges accumulated in the image sensor during the video interval are once thrown through the overflow drain in the photosensing surface and the new accumulation is begun from time $t_1$. According to this method, since any special mechanism is unnecessary, the apparatus can be miniaturized. However, to generate the pulse as indicated by b during the video interval, a leakage pulse remains in the signal read out by the image sensor similarly as in FIG. 4B, so that this causes a bad influence on a picture image. Referring now to FIG. 6, there is shown the relation between the clamp pulse and the video signal. Although, ordinarily, a part of the image sensor is light shielded and an output of this portion is clamped as a reference black (or optical black) level, when the foregoing clear pulse b is generated during the video interval, its leakage component appears as a form (a' in FIG. 7) of which it was added to an output signal component a. Thus, when this leakage component has been once superimposed in this clamping portion, the black level will have been varied, so that there is a drawback such that the luminous level will have been varied for several H.

SUMMARY OF THE INVENTION

It is an object of the present invention to provide an image pickup apparatus which can perform accurate clamping which can solve such technical drawbacks as mentioned above.

Another object of the invention is to provide an image pickup apparatus in which a mixture of an AB noise is small and electric power consumption is small and which has a high blooming prevention effect.

Still another object of the invention is to provide an image pickup apparatus which can effectively suppress the deterioration of a video signal due to the AB noise.

A further object of the invention is to provide an image pickup apparatus which can control the storage state in a photosensing part and in which a noise in association with this control does not exert an influence on the clamping operation.

DETAILED DESCRIPTION OF THE PREFERRED EMBODIMENTS

The present invention will be described in detail hereinbelow with respect to preferred embodiments thereof.

Figure 8:
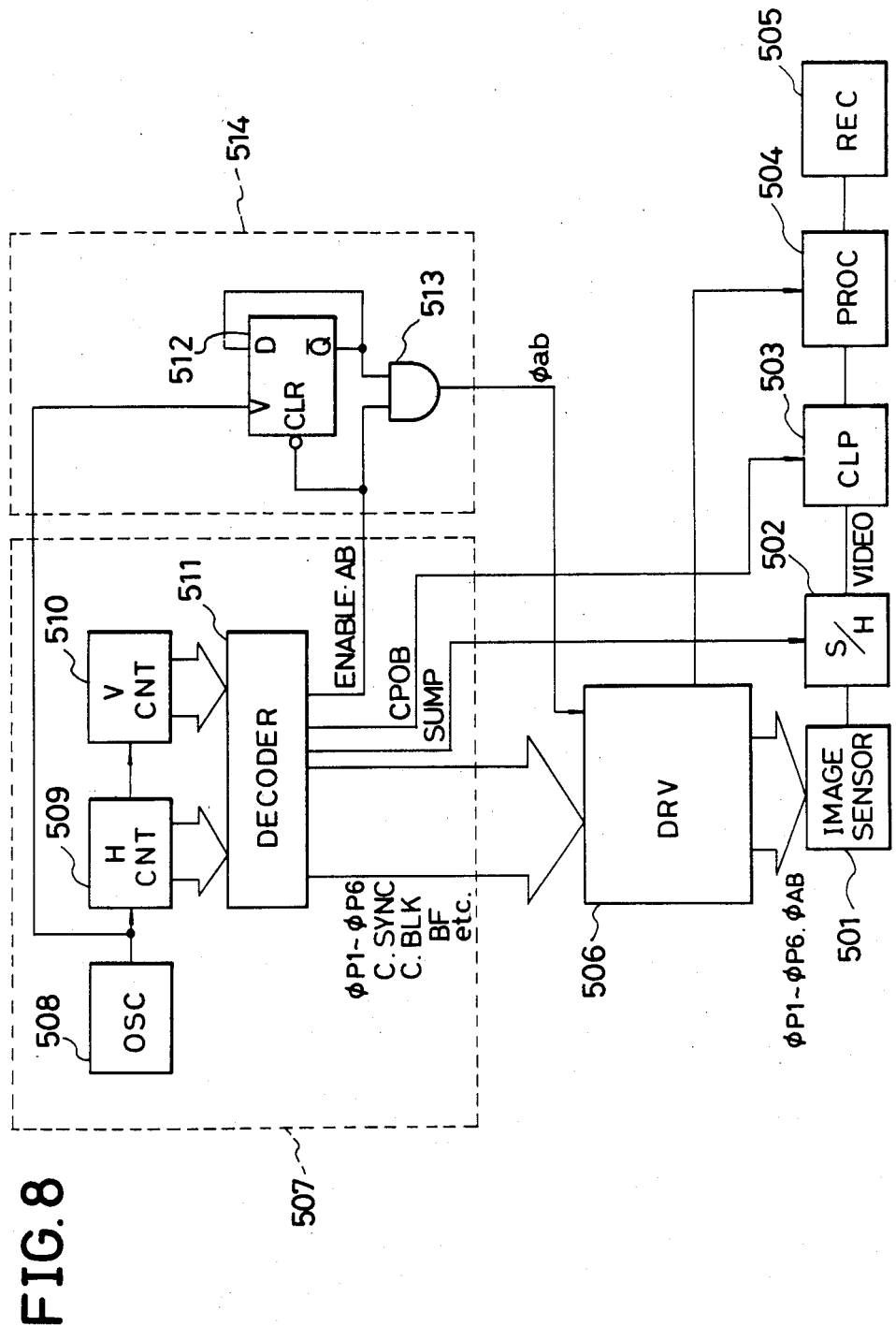
FIG. 8 is a diagram showing a first embodiment of an image pickup apparatus of the present invention.

FIG. 8 is a diagram showing a first embodiment of a constitution of an image pickup apparatus of the present invention. In the diagram, a reference numeral 501 denotes an image sensor serving as image pickup means, which may be a CCD as shown in FIG. 1 or may be an MOS type X-Y address image sensor.

Figure 1:
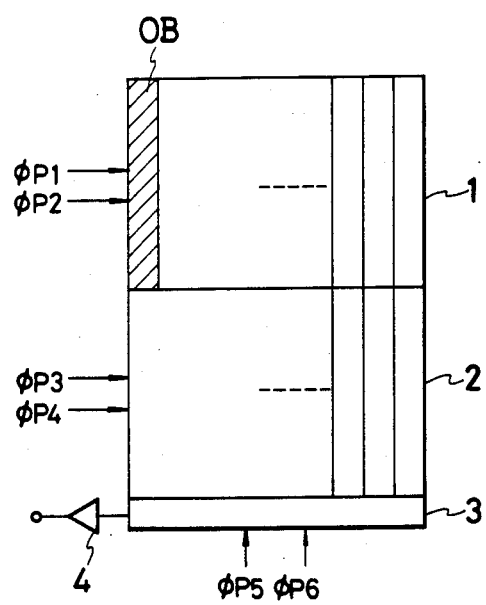
FIG. 1 is a diagram showing an example of an image sensor.
Figure 2:
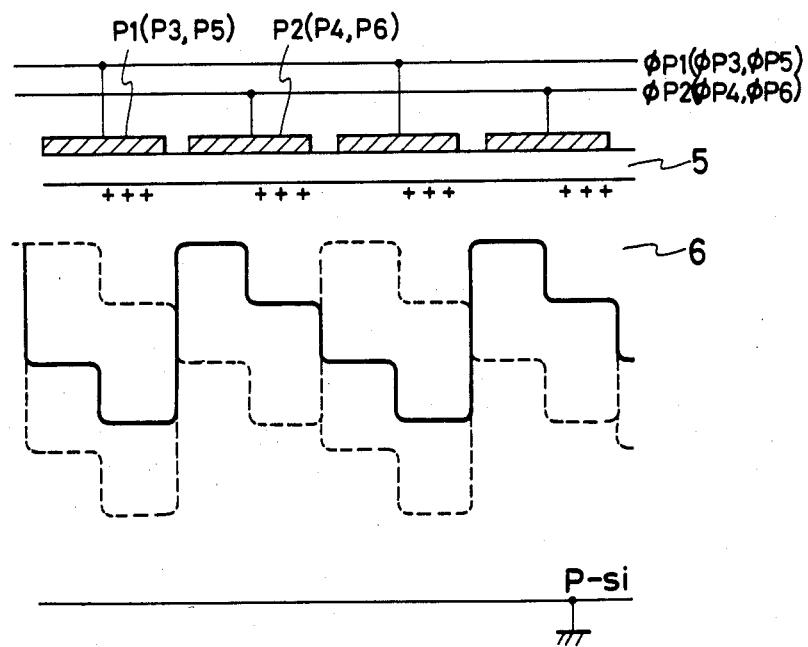
FIG. 2 is a diagram showing an example of a potential profile under each electrode.

In this embodiment, the case will be described where the frame transfer type CCD shown in FIG. 1 is used.

A numeral 506 is a driver circuit serving as readout means for supplying the transfer pulses $\phi_{P1}-\phi_{P6}$ necessary for the transfer in this CCD image sensor and the above-mentioned anti-blooming pulse $\phi_{AB}$. A numeral 507 is a first clock generator for forming the timing signals such as $\phi_{P1}-\phi_{P6}$ and the like among these pulses.

A numeral 514 is a second clock generator serving as accumulation control means or recombination control means. The driver circuit 506 produces the AB pulse $\phi_{AB}$ in response to the timing signal $\phi_{ab}$ from this clock generator 514 and supplies it to the electrode P₁ of the image sensor.

A numeral 508 denotes a reference oscillator; and 509 is a horizontal clock counter for counting an output pulse from the oscillator 508 and producing a horizontal sync signal or the like. A numeral 510 is a vertical clock counter for counting a horizontal sync signal as an output from the horizontal clock counter 509 and outputting a vertical sync signal or the like.

A numeral 511 is a decoder for outputting various kinds of timing pulses in accordance with the output states of the counters 509 and 510.

Namely, this decoder 511 outputs timing signals for a composite sync signal C.Sync, a composite blanking signal C.BLK, and the transfer pulses $\phi_{P1}-\phi_{P6}$, etc. and supplies them to the driver circuit 506.

Also, the decoder 511 together with an AND gate 513 forms inhibiting means according to the present invention.

Figure 9:
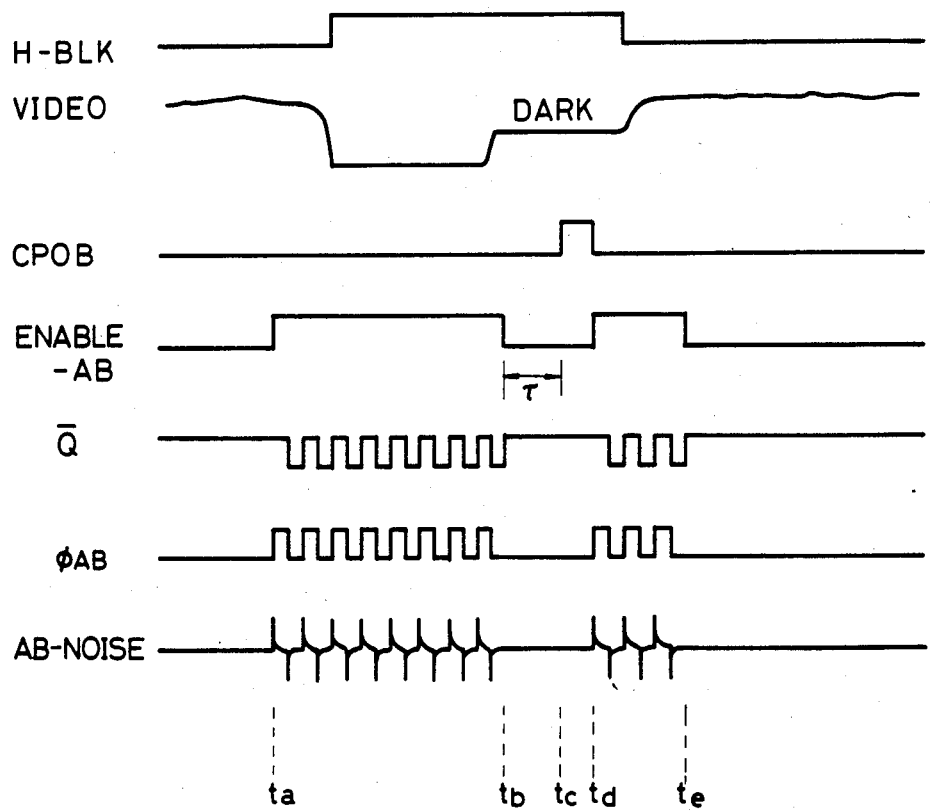
FIG. 9 shows a timing chart thereof.

That is, the generation of an output of the second clock generator is inhibited by outputting an ENABLE-AB signal at a low level at a timing as shown in FIG. 9. A numeral 512 denotes a D flip flop, which forms a frequency divider by inputting a $\overline{Q}$ output to a D input terminal.

In addition, an output of the oscillator 508 is input to a clock input of this flip flop.

On one hand, AND of the $\overline{Q}$ output of the flip flop 512 and the ENABLE-AB signal is formed as the pulse $\phi_{ab}$ by the AND gate 513.

In addition, the decoder 511 outputs a clamp pulse CPOB to a clamping circuit 503, which will be described later, at a timing as shown in FIG. 9. While the clamp pulse CPOB is at a high level, the clamping operation is performed.

The decoder 511 also outputs a sampling pulse SUMP synchronized with the horizontal transfer clock of the image sensor 501 to a sample and hold circuit 502.

On the other hand, the composite sync signal C.Sync and composite blanking signal C.BLK, etc. among the outputs from the driver circuit 506 are supplied to a processing circuit 504.

An output of the processing circuit 504 is supplied to a recording apparatus 505.

FIG. 9 is a chart showing the operation timings of the circuit shown in FIG. 8 and the operation of the circuit shown in FIG. 8 will be described hereinbelow in conjunction with FIG. 9. $ The various kinds of timing pulses formed by the first clock generator 507 are amplified by the driver circuit 506 and the image sensor 501 is fundamentally driven in response to these outputs amplified.

Namely, the horizontal and vertical scans according to the standard television system are performed and a dot-sequence video signal is output.

This dot-sequence signal is sequentially sampled and held by the sample and hold circuit at the next stage, thereby making a duty of the dot-sequence signal wide and removing the noise. Thus, an output VIDEO of this sample and hold circuit 502 becomes as shown in FIG. 9. In addition, an output of the optical black part OB of the image sensor 501 is obtained at the back porch in a horizontal blanking interval H-BLK.

An output of this sample and hold circuit 502 is also clamped by the clamping circuit 503 in response to the clamp pulse CPOB shown in FIG. 9. An output of the clamping circuit 503 is subjected to the correcting processings such as $\gamma$ correction, aperture correction, and the like in the processing circuit, and at the same time it is mixed to the composite sync signal and composite blanking signal, thereafter it is transmitted to the recording apparatus 505.

In this embodiment, the pulse $\phi_{ab}$ is output for only a predetermined interval as shown in FIG. 9 from the second clock generator 514 serving as the recombination control means and this is selectively applied as the AB pulse $\phi_{AB}$ to the electrode P₁ or P₂ of the image sensor.

The pulse $\phi_{AB}$ is switching-controlled by the driver 506 so as to be alternately added to the pulse $\phi_{P1}$ or pulse $\phi_{P2}$ for every one field.

Also, there is the phase difference of one field between the pulses $\phi_{P1}$ and $\phi_{P2}$; therefore, the positions of the potential well and potential barrier are shifted by only the lengths corresponding to the electrodes P₁ and P₂ for every field. This permits be interlace to the performed.

The pulse $\phi_{AB}$ is also applied to the electrode which does not form a potential barrier.

While the pulse $\phi_{ab}$ is applied to the electrode P₁, the pulse $\phi_{P1}$ is switched to 0 volt. While the pulse $\phi_{ab}$ is applied to the electrode P₂, the pulse $\phi_{P2}$ is switched to 0 volt.

Therefore, while the AB pulse $\phi_{AB}$ is applied to the electrode $P_1$ or $P_2$, the overflow charges over a predetermined amount will have been recombined in the photosensing surface, so that the blooming or the like is prevented.

The anti-blooming pulse $\phi_{AB}$ does not act during the vertical transfer interval.

In this embodiment also, the AB pulse $\phi_{AB}$ is cut in response to the ENABLE.AB output signal from the decoder 511 serving as the inhibiting means during the interval when the clamp pulse CPOB is at a high level, namely, while the clamping operation is being performed, and a constant potential is supplied.

Thus, there is no fear that the clamp level is varied due to the noise (shown in FIG. 9) to be caused in association with that the pulse $\phi_{AB}$ is applied.

On the other hand, in this embodiment, the variation in AB pulse $\phi_{AB}$ is inhibited for the interval from an early timing $t_b$ that is earlier by time $\tau$ than a timing $t_c$ when the clamp pulse CPOB becomes a high level to a timing $t_d$ corresponding to the end of the clamping; this inhibition is done to prevent the trailing portion of the AB noise from being mixed to the video signal when clamping.

Moreover, in this embodiment, since the AB pulse is not always supplied while an optical image is being projected into the image sensor, but it is supplied substantially only for the horizontal blanking interval, the noise on the display can be suppressed and a high electric power saving effect is derived.

Furthermore, in this embodiment, since the AB pulse is applied in the interval of $t_a - t_e$ that is longer than the horizontal blanking interval by about a few percent of its horizontal interval, a further larger blooming suppression effect is obtained. In addition, it has been confirmed from the experiments that even if the AB pulse was supplied for an interval that is longer than the horizontal blanking interval by about a few percent of its horizontal interval, the AB noise is hardly mixed in the TV screen.

In this embodiment as well, it has been described an example of the frame transfer type CCD of the two-phase driving system as the image sensor, and the overflow charges are recombined in the photosensing surface by oscillating one of the two electrodes which form one pixel between the voltages of $-V_1$ and $+V_3$; however, it is obvious that the present invention can be applied even in case of, for example, three or more phase driving system.

Also, although an example has been shown whereby the frequency of the AB pulse is relatively high in this embodiment, this frequency may be low and in such a case, the present invention also incorporates the apparatus in which the rising and falling of the AB pulse are inhibited to prevent that the variation portions of the leading and trailing edges and the like of this pulse are mixed during the clamping operation.

Although the charge recombining operation is performed by applying the AB pulse to one of the transfer electrodes in this embodiment, it may be possible to provide an electrode for charge recombination on the potential well in addition to the transfer electrodes and thereby to supply the AB pulse to this electrode.

Figure 3:
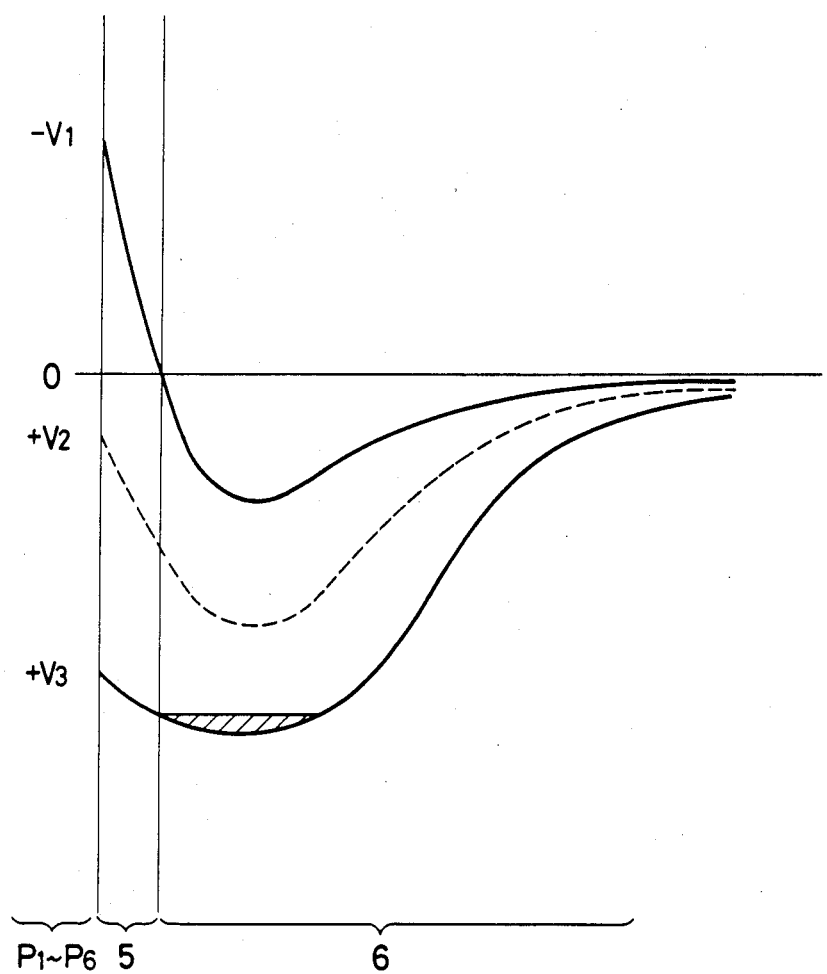
FIG. 3 is a diagram showing the potential characteristics in response to the electrode potential.
Figure 4A:
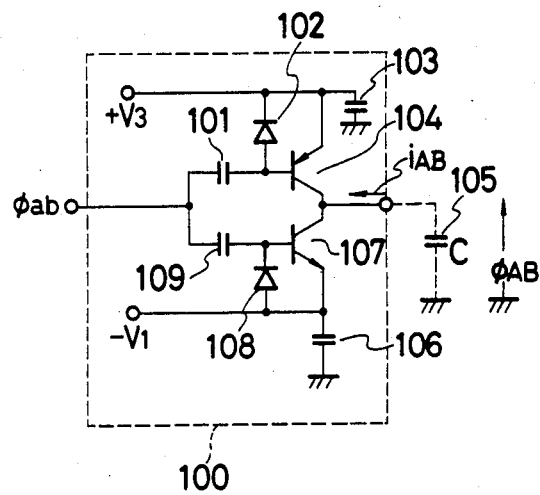
FIGS. 4A and 4B are diagrams for describing a cause of occurrence of an AB noise.
Figure 4B:
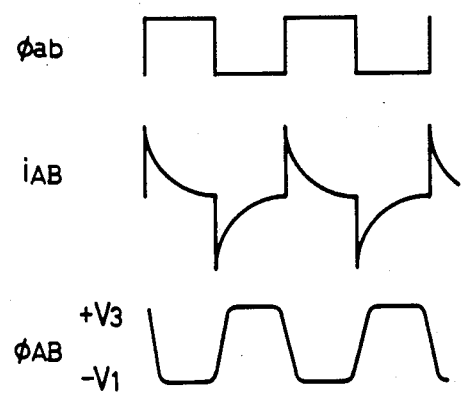
Figure 5:
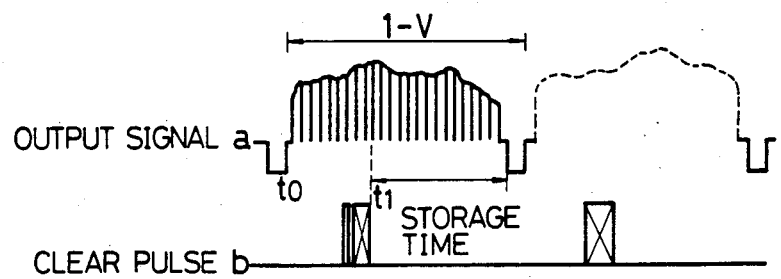
FIG. 5 is a diagram showing a method for controlling the storage time by a clear pulse.
Figure 6:
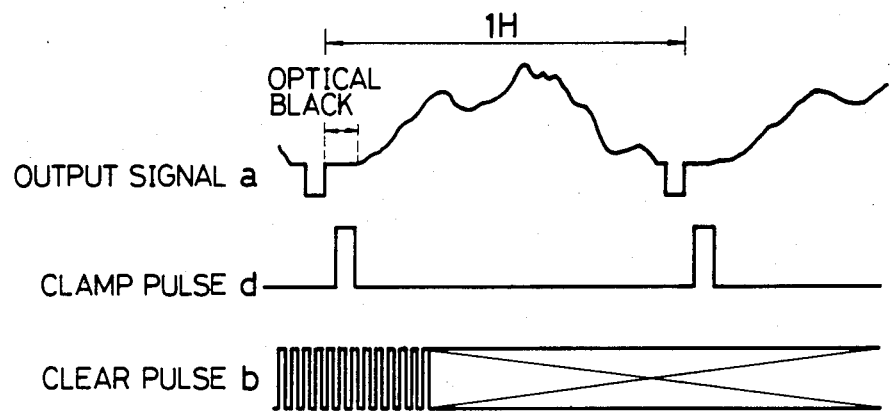
FIG. 6 is a diagram showing the relation between the clear pulse and the clamp pulse.
Figure 7:
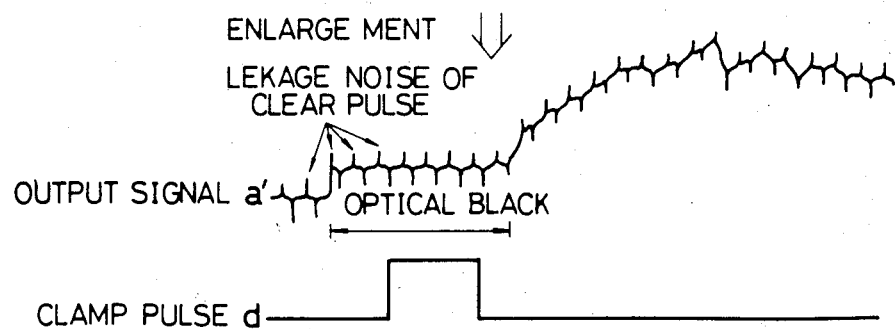
FIG. 7 is a diagram for describing drawbacks in the cases shown in FIGS. 5 and 6.

On one hand, although the signal to control the accumulation state of the photosensing part is not changed at least during the clamping operation in this embodiment, a level of the signal $\phi_{AB}$ to be applied to the potential well of the photosensing part during this interval may be the voltage level $-V_1$ in FIG. 3.

Also, this embodiment is constituted in such a manner that the AB pulse is supplied for the horizontal blanking interval and at the times before and after this interval, but the present invention also includes the apparatus in which the AB pulse is always supplied during the image pickup excluding the clamping interval.

A second embodiment of the present invention will then be described. This embodiment intends to stabilize the clamping operation in the case where the apparatus is constituted so as to control the storage time in the photosensing part.

Figure 10A:
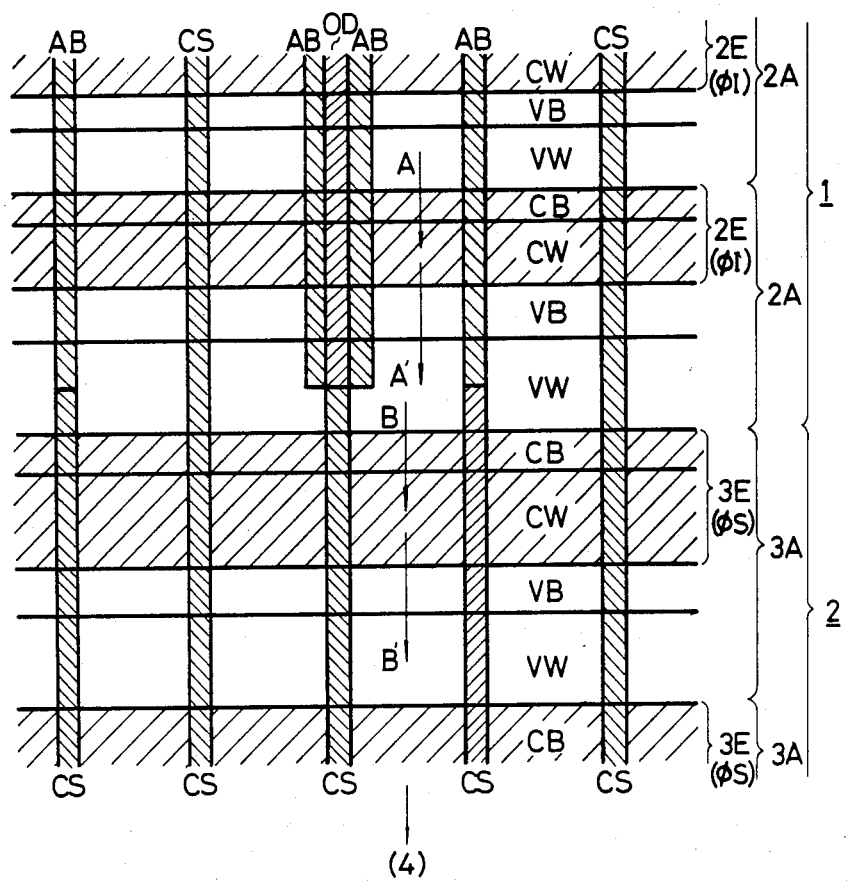
FIGS. 10A and 10B are diagrams showing an example of an electrode arrangement of an FTCCD to describe a second embodiment of the image pickup apparatus of the invention.

For the purpose of simplicity of explanation, it will be described hereinbelow an example of a well-known single-phase driving frame transfer type CCD (hereinbelow, abbreviated as an FTCCD). In addition, since the fundamental construction of the single-phase FTCCD is substantially the same as that shown in FIG. 1, it will be described using the same reference numerals with respect to some parts of such an FTCCD. FIG. 10A shows a detailed constitution near the boundary portion of the photosensing part 1 and storage part 2 of the single-phase FTCCD. In the diagram, CB, CW, VB, and VW represent regions having mutually different potential. One group of these regions constitutes each image pickup cell 2A of the photosensing part 1 and each memory cell 3A of the storage part 2. When levels of the respective potential wells with regard to the electrons are expressed by P(CB), P(CW), P(VB), and P(VW), these regions are formed so that P(CB)>P(CW) and P(VB)>P(VW). For the regions CB and CW in the photosensing part 1, a common electrode (clear electrode) 2E is formed thereon; on the other hand, for the regions CB and CW in the storage part 2, a common electrode 3E is formed thereon, respectively. When a relatively low level voltage (e.g., $-15$ volts) is applied to these electrodes 2E and 3E, the relation in potential well among these four regions becomes P(CB)>P(CW)>P(VB)>P(VW). On the contrary, when a relatively high level voltage (e.g., 0 volt) is applied, the relation becomes P(VB)>P(VW)>P(CB)>P(CW). CS denotes a channel stopper; AB is an anti-blooming barrier in which a height of the barrier is lower than that of the channel stopper CS; and OD is an overflow drain. Each cell 3A of the storage part 2 is segmented by the channel stoppers CS in the horizontal direction, respectively. On the other hand, each cell 2A of the photosensing part 1 is segmented in the horizontal direction by respectively arranging the channel stopper CS, anti-blooming barrier AB, and overflow drain OD having the anti-blooming barriers AB on both sides for every three cells. In addition, in this embodiment, as shown in FIG. 10A, the anti-blooming barrier AB and overflow drain OD in the photosensing part 1 are connected to the channel stoppers CS of the storage part 2 in the region VW of the cell 2A which locates in the final one line of the photosensing part 1.

Figure 10B:
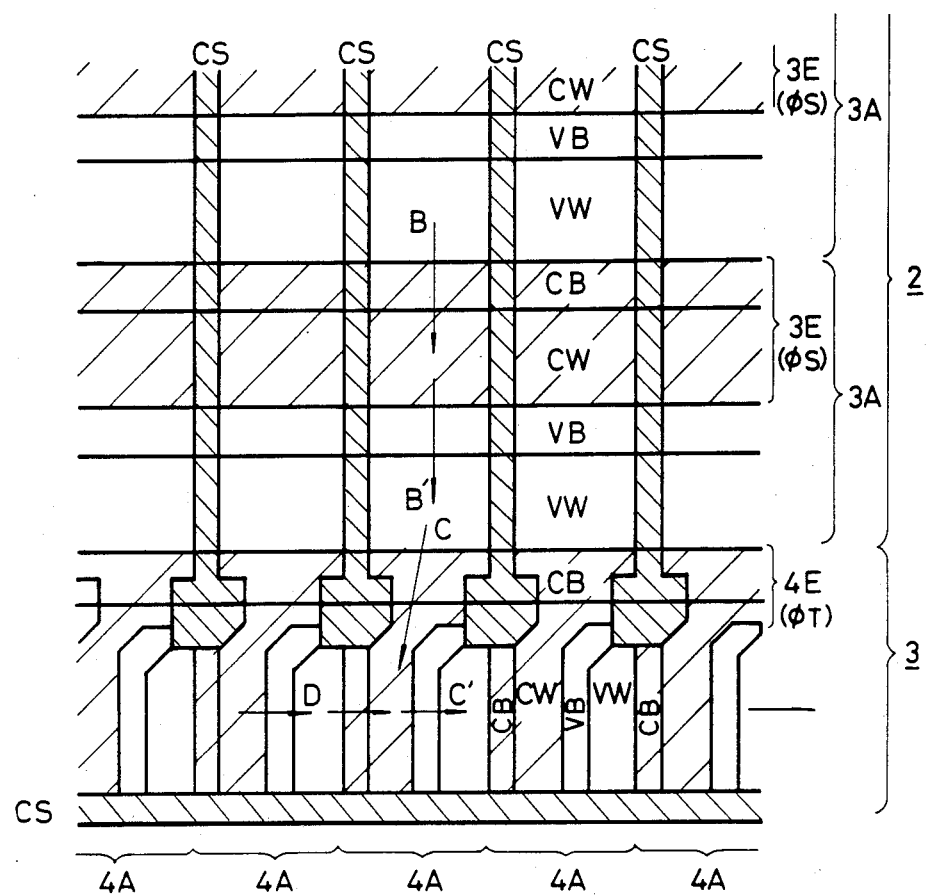

Then, FIG. 10B shows a detailed constitution near the boundary portion between the storage part 2 and horizontal register part 3 of the above-described single-phase FTCCD, in which the same parts and components as those shown in FIG. 10A are designated by the same reference numerals and characters and have the substantially the same constitutions. As illustrated in the diagram, even in the horizontal register part 3, each transfer cell 4A is constituted by one group of the respective regions CB, CW, VB, and VW which are sequentially arranged along the transfer direction of charges, and at the same time the respective cells 4A are made correspond to the different columns of the storage part 3, respectively. Further in detail, the region of CB is interposed between the horizontal register part 3 and the storage part 2 and each transfer cell 4A is arranged to face the region VW of each memory cell 3A through this interposed region CB at the portion of the region CW. In addition, a numeral 4E is a common electrode provided for the regions CB and CW of each transfer cell 4A and for the foregoing interposed region CB.

In the CCD with such a constitution, when the voltages to be applied to the electrodes 2E, 3E and 4E are switched alternately between high and low levels, respectively, the charges are moved as indicated by arrows A and A' in FIG. 10A in the photosensing part 1; as indicated by arrows B and B' in FIGS. 10A and 10B in the storage part 2; as indicated by arrows C and C' in FIG. 10B between the storage part 2 and the horizontal register part 3; and as indicated by arrows D and C' in FIG. 10B in the horizontal register part 3. Due to this, there are obtained such actions as the vertical transfer of the charges from the photosensing part 1 to the storage part 2, step transfer from the storage part 2 to the horizontal register part 3, and horizontal transfer in the horizontal register part 3, respectively. It should be noted that the voltage to be applied to the electrode 2E of the photosensing part 1 is maintained at a low or high level during the photosensing interval, i.e., during the accumulating interval of the optical information, so that the charges generated due to the optical excitation are accumulated in the region VW of each cell 2A (in case of the low level voltage) or in the region CW (in case of the high level voltage). At this time, in the case where the overflow of the charges occurs due to, for instance, an excessive light amount, the overflow charges exceeding the anti-blooming barrier AB flow into the overflow drain OD and are cleared. Or the following method is also possible; namely, the voltage to be applied to the electrode 2E is maintained at an intermediate level (e.g., −7 volts) during the photosensing interval to obtain the potential relation of P(CB)=P(VB)>P(CW)=P(VW); the charges generated due to the optical excitation are accumulated in the regions CW and VW, respectively (that is to say, this means that an image pickup cell consisting of the regions CB and CW and an image pickup cell consisting of the regions VB and VW are equivalently formed); the above-mentioned voltage is switched from the intermediate level to a low level (−15 volts) or to a high level (0 volt) when the charges are vertically transferred from the photosensing part 1 to the storage part 2, thereby appropriately adding the charges stored in the region CW and the charges stored in the region VW to produce a signal of one line; the combination of this addition is changed in dependence upon the odd field and even field (namely, this change-over is done by switching the foregoing voltage from the intermediate level to a low level or to a high level), thereby obtaining the interlace function.

Figure 11:
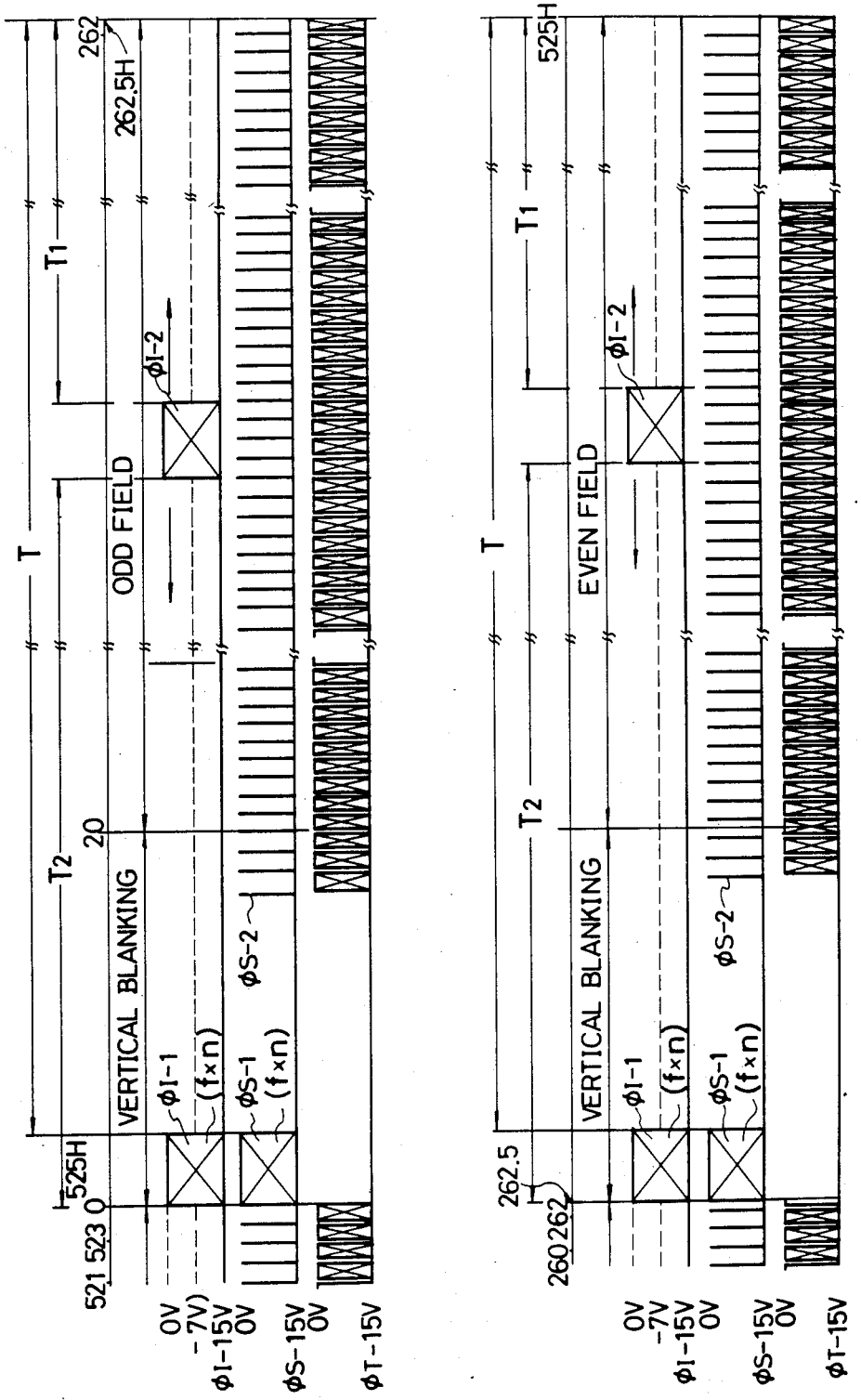
FIG. 11 shows a timing chart for the second embodiment.

It will be then described an embodiment of the present invention in case of using an above-described CCD with reference to FIG. 11. FIG. 11 shows a control signal $\phi_I$ to be applied to the electrode 2E, a control signal $\phi_S$ to be applied to the electrode 3E, and a horizontal transfer pulse train $\phi_T$ to be applied to the electrode 4E.

First of all, upon the readout of the odd field, at the beginning of the vertical blanking interval that is precedent to the odd field interval, mutually synchronized vertical transfer pulse trains $\phi_{I-1}$ and $\phi_{S-1}$ are applied as the foregoing control signals $\phi_I$ and $\phi_S$. Now assuming that the arrangement numbers of cells 2A and 3A in the vertical direction, i.e., the number of lines are both n, both of the pulse trains $\phi_{I-1}$ and $\phi_{S-1}$ include n pulses and when the pulse frequency at this time is set into f, by applying such vertical transfer pulse trains $\phi_{I-1}$ and $\phi_{1-1}$, the charges are vertically transferred from the photosensing part 1 to the storage part 2 in the interval of 1/f×n, i.e., a few H. Thereafter, the accumulation of new charges is started in the photosensing part 1 and for this purpose, the control signal $\phi_I$ is maintained, for example, at a low level (−15 volts) or at an intermediate level (−7 volts).

After that, a step transfer pulse train $\phi_{S-2}$ is applied as the control signal $\phi_S$ to the storage part 2, and at the same time the horizontal transfer pulse train $\phi_T$ is applied to the horizontal register part 3 in response to this, so that the charges stored in the storage part 2 are sequentially read out one line by one through the horizontal register part 3.

When the readout of the odd field has been finished as described above, the vertical transfer pulse trains $\phi_{I-1}$ and $\phi_{S-2}$ are again applied in the subsequent vertical blanking interval, so that the charges are vertically transferred and thereafter the accumulation of the charges is again started in the photosensing part 1. On the other hand, the step transfer pulse train $\phi_{S-2}$ and horizontal transfer pulse train $\phi_T$ are again applied to the storage part 2 and horizontal register part 3, respectively, thereby allowing the even field to be read out.

In this way, the readout operations of the odd and even fields are alternately repeated.

On the contrary, in this embodiment, for example, a charge clear pulse train $\phi_{I-2}$ which is equivalent to the vertical transfer pulse train $\phi_{I-1}$ is applied to the photosensing part 1 at a proper time while the stored charges are being read out from the storage part 2 if necessary. Namely, in the photosensing part 1, the charges are vertically transferred toward the storage part 2 due to this. However, at this time, the storage part 2 is in the step transfer mode of the charges and is not in the state adapted to fetch the charges which are sent from the photosensing part 1 in association with its vertical transfer; consequently, this causes an overflow of charges in the photosensing part 1 and these overflow charges flow into the overflow drain OD (FIG. 10A) and are cleared. As the charge clear pulse train $\phi_{I-2}$, at least the pulses over the number of lines n mentioned above are applied. In addition, its frequency f' may be set into an arbitrary value and a high frequency will present an effect such that the charges can be cleared in extremely a short time. However, too high frequency results in deterioration in transfer efficiency of the charges as is well known, so that this causes a clearing efficiency to deteriorate. On the other hand, a low frequency needs a much more time to clear, so that this causes an opportunity of inflow of the charges into the storage part 2 to be increased and the apparatus may be easily affected; therefore, a value of this frequency should be suitably selected in consideration of these points. It is apparently possible to set such that f'=f. Due to this, for the time T substantially corresponding to conventional one vertical synchronous interval, it is possible to obtain the time as shown at T₁ in FIG. 1, for example, that is far shorter than it. As shown by adding the arrows to the clear pulse train $\phi_{I-2}$ in FIG. 11, the accumulating time in this case can be properly changed by, for instance, changing the timing at which the pulse train $\phi_{I-2}$ is applied by controlling a time $T_2$ from the beginning of the vertical blanking interval to the time when the applying of the clear pulse train $\phi_{I-2}$ is started.

Although the charges are cleared from the photosensing part 1 using the overflow drain OD provided in the photosensing part 1 as described above, in the case where the consideration is made with respect to only this charge clearing, the overflow drain OD may be provided only near the boundary portion between the photosensing part 1 and the storage part 2 as proposed in, for example, the former Japanese Patent Application No. 218882/82 according to the applicant of this case.

A practical example of the circuit system to obtain the above-described control signals and pulse trains will then be described with reference to FIG. 12.

Figure 12:
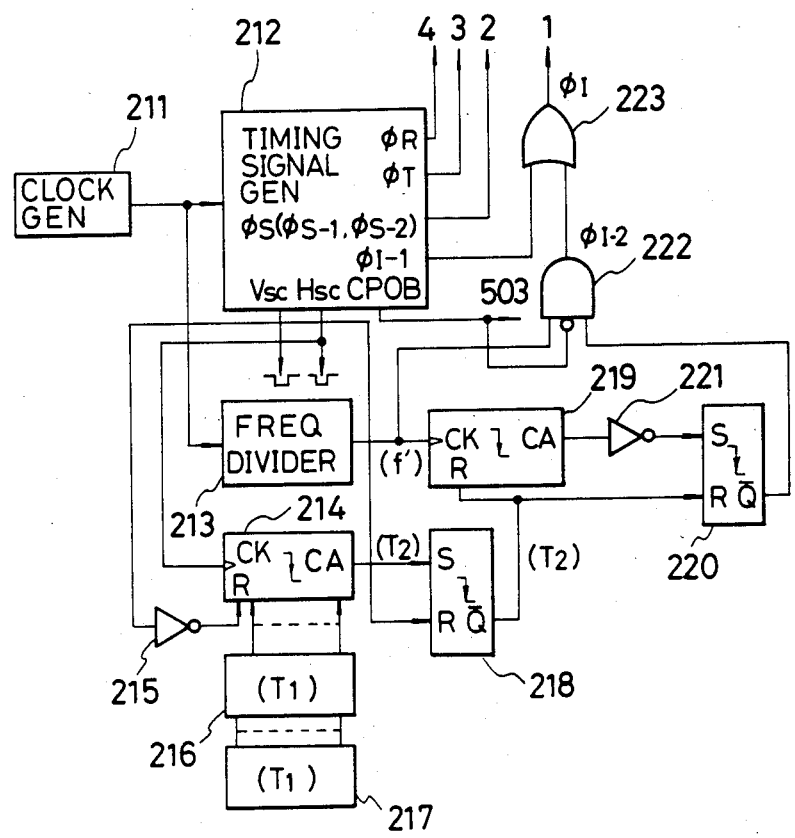
FIG. 12 is a diagram showing an example of a constitution of the second embodiment.

In FIG. 12, a reference numeral 211 denotes a clock generator for generating a reference clock pulse of a predetermined frequency; and 212 represents a timing signal generator for producing the control signals $\phi_S$ and $\phi_I$ including the pulse trains $\phi_{I-1}$, $\phi_{S-1}$ and $\phi_{S-2}$ are described in FIG. 11, a reset pulse train $\phi_R$ for an output amplifier section 4, a vertical sync signal $V_{SC}$ for a television and a horizontal sync signal $H_{SC}$, and the clamp pulse CPOB at a high level to be output at a timing corresponding to the optical black portion shown in FIG. 1 in response to the reference clock pulse from the clock generator 211. This generator 212 is constituted by a frequency divider, counter, ROM, flip flop, logic gate, etc. The description of such a timing signal generator is omitted. A numeral 213 is a frequency divider for frequency dividing the clock pulse from the clock generator 211 and obtaining the clock pulse of the frequency f' which is the fundamental pulse for the charge clear pulse train $\phi_{I-2}$. A numeral 214 is a presettable counter for counting the trailing edge of the horizontal sync signal $H_{SC}$ from the timing signal generator 212 and is reset in response to a high output of an inverter 215 for inverting the vertical sync signal $V_{SC}$ from the generator 212. A numeral 216 is a presetting circuit for the counter 214; and 217 is for example a digital code switch for selecting the accumulating time. By operating this switch 217, for example, the data corresponding to the charge accumulating time $T_1$ described in conjunction with FIG. 11 is preset through the presetting circuit 216 for the counter 214. The counter 214 has, for example, the maximum count capacity of the number (e.g., 256) substantially corresponding to the number (e.g., about 250) of horizontal sync signals which are included in one vertical synchronous interval (one field interval). Therefore, by presetting the data corresponding to the storage time $T_1$ through the presetting circuit 216, a carry output of the counter 214 substantially specifies the interval $T_2$ mentioned in FIG. 11. A numeral 218 denotes a flip flop which is reset in response to the trailing edge of the vertical sync signal $V_{SC}$ from the timing signal generator 212 and is set in response to the trailing edge of the carry output of the counter 214; and 219 is a counter for counting the trailing edge of the output pulse of the frequency divider 213 and this counter is constituted in the manner such that it is reset responsive to a high $\overline{Q}$ output of the flip flop 218 and generates a carry output at a count of (n+m), in which m indicates a margin of about a few tens. A numeral 220 is a flip flop which is reset in response to the trailing edge of the $\overline{Q}$ output of the flip flop 218 and is set in response to the trailing edge of an output of an inverter 221 for inverting a carry output of the counter 219; and 222 is an AND circuit which receives an output pulse of the frequency divider 213, a $\overline{Q}$ output of the flip flop 220, and an inversion output of the clamp pulse CPOB. An output of this AND circuit 222 becomes the charge clear pulse train $\phi_{I-2}$. A numeral 223 is an OR circuit which receives the pulse train $\phi_{I-1}$ from the timing signal generator 212 and the charge clear pulse train $\phi_{I-2}$ from the AND circuit 222. An output of this OR circuit becomes the control signal $\phi_I$ for the photosensing part 2. In addition, the accumulation control means or clear means according to the present invention is constituted by the counter 219, inverter 221, flip flop 220, etc.

In such a constitution, when the power supply from a power supply circuit (not shown) is started, each circuit starts operating, so that the outputs of $\phi_{I-1}$, $\phi_S$ ($\phi_{S-1}$, $\phi_{S-2}$), $\phi_T$, $\phi_R$, $V_{SC}$, $H_{SC}$, and CPOB from the timing signal generator 212 are begun in response to the various kinds of signals and pulses. At this time, the flip flop 218 is reset responsive to the trailing edge of the vertical sync signal $V_{SC}$ and its $\overline{Q}$ output becomes high, so that the counter 219 is set into the reset state (count disenabled state). On one hand, the counter 214 is reset in response to a high output of the inverter 215 for inverting the vertical sync signal $V_{SC}$, and thereafter it counts the horizontal sync signal $H_{SC}$. During this interval, in the CCD, the charges are vertically transferred from the photosensing part 1 to the storage part 2 and the charges are being read out from the storage part 2 after that. Now, when the counter 214 finishes counting the value of which the preset data corresponding to the charge storage time $T_1$ from the presetting circuit 216 was subtracted from the maximum count capacity of the counter 214, it generates a carry output and in response to the trailing edge thereof, the flip flop 218 is set, so that its $\overline{Q}$ output becomes low. Due to this, the reset state of the counter 219 is canceled, so that it starts counting the trailing edge of the pulse from the frequency divider 213, while at this time the flip 220 is reset in response to the trailing edge of the $\overline{Q}$ output of the flip flop 218 and its $\overline{Q}$ output becomes high. Thus, the AND circuit 222 outputs the pulse train of the frequency f' from the frequency divider 213 and this is output as the charge clear pulse train $\phi_{I-2}$ through the OR circuit 223. As a result, in the CCD, the charges which have been accumulated so far, namely, for the interval $T_2$ in FIG. 11 are cleared from the photosensing part 1 due to the foregoing actions. When the counter 219 finishes counting (n+m), it generates a carry output at the next count of (n+m+1). However, the flip flop 220 is set in response to the trailing edge of the output of the inverter 221 for inverting the above carry output at this time, so that its $\overline{Q}$ output becomes low and this causes the output of the pulse train, i.e., the clear pulse train $\phi_{I-2}$ from the AND circuit 222 to be shut off. Thereafter, when almost of the charge storage time $T_1$ has passed, the charges are vertically transferred from the photosensing part 1 to the storage part 2 in the CCD as described above, then they are read out through the horizontal register part 3. After that, the similar operations are repeated.

In this way, as the charge storage time in the photosensing part 1 of the CCD, the time $T_1$ shorter than one vertical synchronous interval T is derived. In this embodiment, this time $T_1$ can be arbitrarily changed by varying a preset value for the counter 214 by operating the digital code switch 217.

In addition, in this embodiment, the apparatus is constituted in the manner such that the output of the AND circuit 222 becomes a low level while the clamp pulse at a high level is being output from the timing signal generator 212. Namely, after the clamp pulse from the timing signal generator 212 was inverted, it is input to the AND circuit 222; therefore, this AND circuit 222 provides the inhibiting means according to the present invention.

On the other hand, since only (n+m) pulses $\phi_{I-2}$ for clearing the charges are inherently supplied, even if they are cut during the clamping interval, the whole charges in the photosensing part 1 can be drained through the drain.

Moreover, after the control signals and pulse trains $\phi_S$ ($\phi_{S-1}$, $\phi_{S-2}$), $\phi_T$ and $\phi_R$ from the timing signal generator 212, and the control signals $\phi_I$ ($\phi_{I-1}$, $\phi_{I-2}$) from the OR circuit 223 were level adjusted by a voltage regulator or the like as needed, they are applied to the CCD 1.

Although the charge storage time $T_1$ can be selected by the operation of the digital code switch 217 in the example of FIG. 12, it may be automatically adjusted on the basis of, for example, the information of brightness of an object to be photographed or the like. FIG. 13 shows two examples in such a case.

Figure 13A:
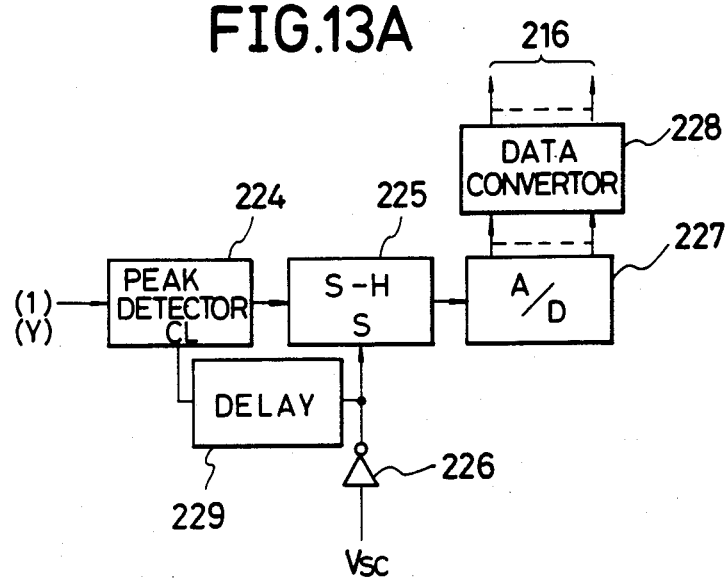
FIGS. 13A and 13B are diagrams showing modifications of the constitution shown in FIG. 12, respectively.

Referring first to FIG. 13A, there is shown an example in the case where the charge storage time $T_1$ is automatically controlled according to the output of the CCD. In the diagram, a reference numeral 224 denotes a peak detector for an output of the CCD or a luminance signal to be obtained by processing it. Although an example of the peak detector will be described below, but it may be a mean value circuit or an integrating circuit. A numeral 225 denotes a sample and hold circuit for holding an output of the peak detector 224 in response to a high output of an inverter 226 for inverting the vertical sync signal $V_{SC}$. 227 is an A/D converter for A/D converting an output of the sample and hold circuit 226; and 228 is a data converter for converting an output data of the A/D converter 227 into a storage time data and its output is applied to the presetting circuit 216 in FIG. 12. When it is assumed that the A/D converter 227 outputs a larger data as a luminous level of the output of the CCD is higher, the data converter 228 is constituted so that it outputs a data which is reversely proportional to this, i.e., a smaller data. Namely, it may be understood that the output data of the A/D converter 227 corresponds to the interval $T_2$ mentioned with regard to FIG. 11. A numeral 229 is a delay circuit provided to clear the peak detector 224 in order to detect a new peak value after completion of the holding of an output of the peak detector 224 by the sample and hold circuit 225.

Figure 13B:
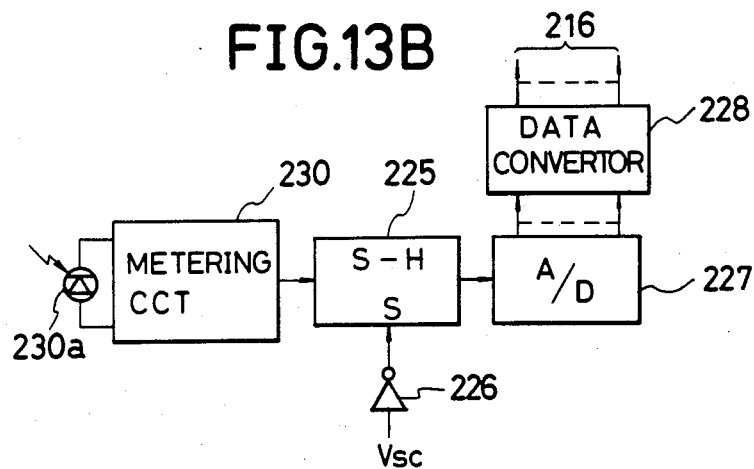

On the other hand, FIG. 13B shows an example in the case where the light equivalent to the light which the photosensing part 1 of the CCD will receive is measured, thereby automatically controlling the storage time on the basis of its measurement value. That is, in place of the peak detector 224 (and the delay circuit 229) in FIG. 13A, there is used a metering circuit 230 having a metering element 230a adapted to receive the light equivalent to the light which the photosensing part 1 of the CCD will receive. Its measurement output is provided as an input to the sample and hold circuit 225.

In this way, accordint to the two examples shown in FIGS. 13A and 13B, it is possible to automatically control the charge storage time $T_1$ in the photosensing part 1 of the CCD on the basis of the information of brightness of an object to be photographed.

In addition, in the present embodiment, the overflow is forcibly caused by concentrating the charges in the photosensing part into a predetermined portion and by providing the drain for draining these overflow charges, they are cleared in the photosensing part. However, it is obvious that the present invention can be also applied to the apparatus which is constituted in the manner such that, for instance, a drain is provided in the photosensing part and thereby enabling the charges in each photosensing region in the photosensing part to be selectively drained into this drain through a barrier or gate in which a potential level can be controlled. Namely, even in this case, the malfunction of the clamping operation can be prevented by making the inhibiting means operative so as not to change the potential level of the foregoing barrier or gate during the clamping as well.

As described above, according to the present invention, since there is provided inhibiting means for inhibiting a change in signal for controlling the accumulation state at least during the clamping operation by the clamping circuit, the line-drawing like low frequency noise will not mixed in the screen.

In addition, since a change in signal for recombining the charges is inhibited during the clamping operation, the blooming can be prevented and the clamping operation is also stabilized.

Furthermore, since a change in charge clear state for controlling the storage time is inhibited during the clamping operation, the invention has many effects such that the shutter effect is obtained and that the accurate clamping operation is provided, and the like.

What is claimed is:

1. An image pickup apparatus comprising:
    (a) a photosensing part for converting an object into electrical information and storing said information;
    (b) storage control means for storing said electrical information into said photosensing part for a predetermined interval and controlling a storage state in this storage interval;
    (c) clamping means for clamping a part of the electrical information read out from said photosensing part; and
    (d) inhibiting means for inhibiting a change in an output signal of said control means at least during the clamping operation by said clamping means,
    wherein said storage control means controls the storage state by erasing at least a part of the electrical information in said photosensing part during the storage interval.

2. An image pickup apparatus according to claim 1, wherein said storage control means controls the storage state by leading at least a part of the electrical information in said photosensing part to a drain and erasing said part of the electrical information during the storage interval.

3. An image pickup apparatus according to claim 2, wherein said storage control means controls the storage state by concentrating the electrical information in said photosensing part into a portion of the photosensing part during the storage interval and causing the electrical information to overflow in said portion, and at the same time by leading the overflow information into an overflow drain and erasing it.

4. An image pickup apparatus comprising:
   (a) image sensing means for converting an object into charge information of a predetermined polarity;
   (b) recombination control means for outputting a signal to allow said charge information in said image sensing means to be recombined with charges of another polarity;
   (c) clamping means for clamping a part of an output of said image sensing means; and
   (d) inhibiting means for inhibiting a change in an output of said control means at least during the clamping operation by said clamping means.

5. An image pickup apparatus according to claim 4, wherein said recombination means outputs an alternating signal to recombine said charge information.

6. An image pickup apparatus according to claim 4, further comprising a light shielded section, provided in a portion of said image sensing means, for producing a signal at a black reference level.

7. An image pickup apparatus according to claim 6, wherein said clamping means clamps the electrical information corresponding to said light shielded section among the electrical information read out from said image sensing means.

8. An image pickup apparatus according to claim 4, wherein said inhibiting means includes a logical gate circuit.

9. An image pickup apparatus comprising:
   (a) a photosensing part for converting an object into electrical information and storing said information;
   (b) readout means for periodically reading out the electrical information in said photosensing part;
   (c) clearing means for outputting a signal to allow the electrical information in said photosensing part to be cleared independently of said periodic readout operation by said readout means;
   (d) clamping means for clamping a part of the electrical information read out from said photosensing part; and
   (e) inhibiting means for inhibiting a change in an output of said clearing means at least during the clamping operation by said clamping means.

10. An image pickup apparatus according to claim 9, wherein said clearing means leads at least a part of the electrical information in said photosensing part to a drain and clears said part of the electrical information.

11. An image pickup apparatus according to claim 10, wherein said clearing means allows the electrical information in said photosensing part to be concentrated into a portion of the photosensing part and causes the electrical information to overflow in said portion, and at the same time it leads the overflow electrical information into an overflow drain and clears it.

12. An image pickup apparatus according to claim 9, further comprising a light shielded section provided in a portion of said photosensing part.

13. An image pickup apparatus according to claim 12, wherein said clamping means clamps the electrical information corresponding to said light shielded section among the electrical information read out from said photosensing part.

14. An image pickup apparatus according to claim 9, wherein said inhibiting means includes a logical gate circuit.

15. An image pickup apparatus comprising:
   (a) photosensing part for converting an object into electrical information and storing said information;
   (b) clamping means for clamping a part of the electrical information read out from said photosensing part; and
   (c) storage control means for allowing the electrical signal to be stored in said photosensing part for a predetermined interval and changing the storage state of the electrical information in said photosensing part during said storage interval, said means allowing said storage state not to be changed at least during the clamping operation by said clamping means,
   wherein said storage control means controls the storage state by erasing at least a part of the electrical information in said photosensing part during the storage interval.

16. An image pickup apparatus according to claim 15, wherein said storage control means controls the storage state by allowing at least a part of the electrical information in said photosensing part to be charge-recombined and erasing said part of the electrical information during the storage interval.

17. An image pickup apparatus according to claim 15, wherein said storage control means controls the storage state by leading at least a part of the electrical information in said photosensing part to a drain and erasing said part of the electrical information during the storage interval.

18. An image pickup apparatus according to claim 15, wherein said storage control means controls the storage state by concentrating the electrical information in said photosensing part into a portion of the photosensing part during the storage interval and causing the electrical information to overflow in said portion, and at the same time by leading the overflow information into an overflow drain and erasing it.

19. An image pickup apparatus comprising:
   (a) image sensing means for converting an object into charge information of a predetermined polarity;
   (b) clamping means for clamping a part of an output of said image sensing means; and
   (c) recombination control means for outputting a signal to allow said charge information in said image sensing means to be recombined with charges of another polarity, said means allowing a level of said signal for the recombination not to be changed at least during the clamping operation by said clamping means.

20. An image pickup apparatus according to claim 19, wherein said recombination means outputs an alternating signal to recombine said charge information.

21. An image pickup apparatus according to claim 19, further comprising a light shielded section, provided in a portion of said image sensing means, for producing a signal at a black reference level.

22. An image pickup apparatus according to claim 21, wherein said clamping means clamps the electrical information corresponding to said light shielded section among the electrical information read out from said image sensing means.

23. An image pickup apparatus comprising:
   (a) a photosensing part for converting an object into electrical information and storing said information;
   (b) readout means for periodically reading out the electrical information in said photosensing part;

(c) clamping means for clamping a part of the electrical information read out from said photosensing part; and (d) clearing means for outputting a signal to allow the electrical information in said photosensing part to be cleared independently of the periodic readout operation by said readout means, said means allowing a level of said signal for clearing not to be changed at least during the clamping operation by said clamping means.

24. An image pickup apparatus according to claim 23, wherein said clearing means leads at least a part of the electrical information in said photosensing part to a drain and clears said part of the electrical information.

25. An image pickup apparatus according to claim 24, wherein said clearing means allows the electrical information in said photosensing part to be concentrated into a portion of the photosensing part and causes the electrical information to overflow in said portion, and at the same time it leads the overflow electrical information into an overflow drain and clears it.

26. An image pickup apparatus according to claim 23, further comprising a light shielded section provided in a portion of said photosensing part.

27. An image pickup apparatus according to claim 36, wherein said clamping means clamps the electrical information corresponding to said light shielded section among the electrical information read out from said photosensing part.

28. An image pickup apparatus comprising:
(a) radiation sensing means for generating an electrical signal according to incident radiation;
(b) storage control means for causing said radiation sensing means to store the electrical signal, said storage control means changing the storage state of said radiation sensing means within a period of integration time;
(c) clamping means for clamping at least a part of the electrical signal; and
(d) inhibiting means for inhibiting change of said storage state for a period of the integration time in response to the clamping operation of said clamping means.

29. An image pickup apparatus according to claim 28, wherein said radiation sensing means includes a radiation sensing part and a radiation insensitive part.

30. An image pickup apparatus according to claim 29, wherein said clamping means is arranged to clamp the electrical signal generated at said radiation insensitive part.

31. An image pickup apparatus according to claim 28, wherein said storage control means changes the storage state by re-combining the electrical signal of said radiation sensing means.

32. A image pickup apparatus according to claim 28, wherein said storage control means changes the storage state such that the electrical signal stored in said radiation sensing means is introduced into a drain within the integration time.

33. An image pickup apparatus according to claim 28, further comprising a drain into which the electrical signal generated by said radiation sensing means is introduced, wherein said storage control means changing the storage state by introducing the electrical signal stored in said radiation sensing means into said drain within the integration time.

34. An image pickup apparatus comprising:

(a) radiation sensing means for generating an electrical signal according to incident light;
(b) erasing means for erasing at least a part of said electrical signal;
(c) clamping means for clamping a part of said electrical signal; and
(d) control means for controlling such that erasing operation of said erasing means is not performed simultaneously with the clamping operation of said clamping means.

35. An image pickup apparatus according to claim 34, wherein said erasing means erases said electrical signal by re-combining said electrical signal.

36. An image pickup apparatus according to claim 34, wherein said radiation sensing means includes a radiation sensing part and a radiation insensitive part.

37. An image pickup apparatus according to claim 34, wherein said clamping means is arranged to clamp the electrical signal generated at said radiation insensitive part.

38. An image pickup apparatus comprising:
(a) radiation sensing means for generating an electrical signal according to incident light, said sensing means comprising an integrating part for integrating the electrical signal within a predetermined time;
(b) erasing means for erasing at least a part of the integrated electrical signal at said integrating part within said predetermined time;
(c) clamping means for clamping a part of the integrated signal; and
(d) control means for controlling such that erasing operation of said erasing means is not performed simultaneously with the clamping operation of said clamping means.

39. An image pickup apparatus according to claim 38, wherein said radiation sensing means includes a radiation sensing part and a radiation insensitive part.

40. An image pickup apparatus according to claim 38, wherein said clamping means is arranged to clamp the electrical signal generated at said radiation insensitive part.

41. An image pickup apparatus according to claim 38, wherein said erasing means erases said electrical signal by re-combining said electrical signal.

42. An image pickup apparatus according to claim 38, wherein said storage control means changes the storage state by re-combining the electrical signal of said radiation sensing means.

43. An image pickup apparatus according to claim 38, wherein said storage control means changes the storage state such that the electrical signal stored in said radiation sensing means is introduced into a drain within the integration time.

44. An image pickup apparatus according to claim 38, further comprising a drain into which the electrical signal generated by said radiation sensing means is introduced wherein said control means changing the storate state by introducing the electrical signal stored in said radation sensing means into said drain within the integration time.

45. An image pickup apparatus comprising:
(a) radiation sensing means for generating an electrical signal according to incident radiation;
(b) storage control means for causing said radiation sensing means to store the electrical signal, said storage control means changing the storage state of said radiation sensing means within a period of integration time;

(c) clamping means for clamping at least a part of the electrical signal; and (d) control means for causing operation of said storage control means not to be performed simultaneously with the clamping operation of said clamping means.

46. An image pickup apparatus according to claim 45, wherein said radiation sensing means includes radiation sensing part and a radiation insensitive part.

47. An image pickup apparatus according to claim 46, wherein said clamping means is arranged to clamp the electrical signal generated at said radiation insensitive part.

48. An image pickup apparatus according to claim 45, wherein said storage control means changes the storage state by re-combining the electrical signal of said radiation sensing means.

* * * * *